United States Patent
Blatt

[11] 3,920,042
[45] Nov. 18, 1975

[54] FLOW CONTROL VALVE
[76] Inventor: Leland F. Blatt, 31915 Groesbeck Highway, Fraser, Mich. 48206
[22] Filed: Jan. 20, 1975
[21] Appl. No.: 542,348

[52] U.S. Cl. ............. 137/523; 137/513.5; 251/340
[51] Int. Cl.² ........................................ F16K 15/18
[58] Field of Search .......... 91/443; 137/513.5, 523; 251/340

[56] References Cited
UNITED STATES PATENTS

| | | |
|---|---|---|
| 834,855 | 10/1906 | Woodman .................... 137/513.5 X |
| 903,451 | 11/1908 | Clark ................................. 251/340 |
| 2,813,545 | 11/1957 | Garnik .......................... 251/340 X |
| 2,985,425 | 5/1961 | Tang ................................ 251/340 |

FOREIGN PATENTS OR APPLICATIONS

| | | |
|---|---|---|
| 783,740 | 4/1935 | France ............................... 251/340 |

Primary Examiner—Robert G. Nilson
Attorney, Agent, or Firm—Cullen, Settle, Sloman & Cantor

[57] ABSTRACT

A flow control valve has a body with a bore, a valve seat, a ball valve biased onto said seat and end caps on the body providing when connected to a fluid system for free flow in one direction and adjustable controlled flow in the other direction. A control rod extends through and is secured to the ball valve with one end guidably mounted upon the body and having a reduced end defining a shoulder. A longitudinally adjustable rod stop guide slidably receives said reduced end bearing against said shoulder and is slidably mounted on the body. An adjusting sleeve is mounted on the body interposed between the end caps and threadedly engages the rod stop guide so that on rotary movement of said sleeve relative to the body the ball valve may be variably unseated for regulating flow in said other direction from no flow to full flow.

7 Claims, 4 Drawing Figures

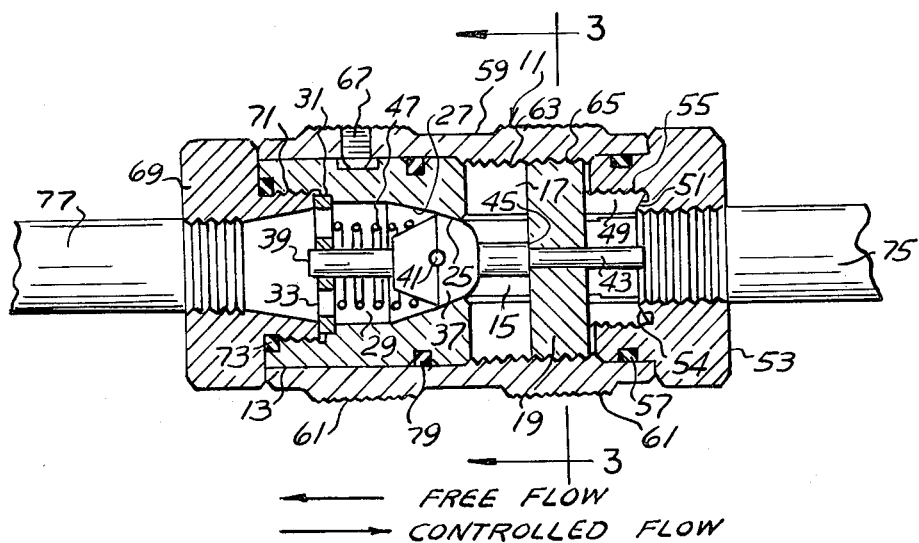
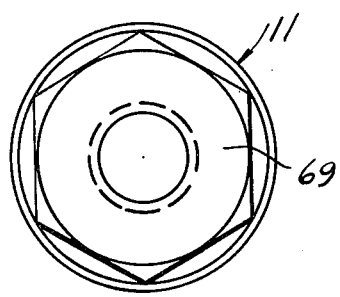
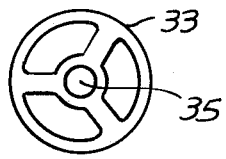
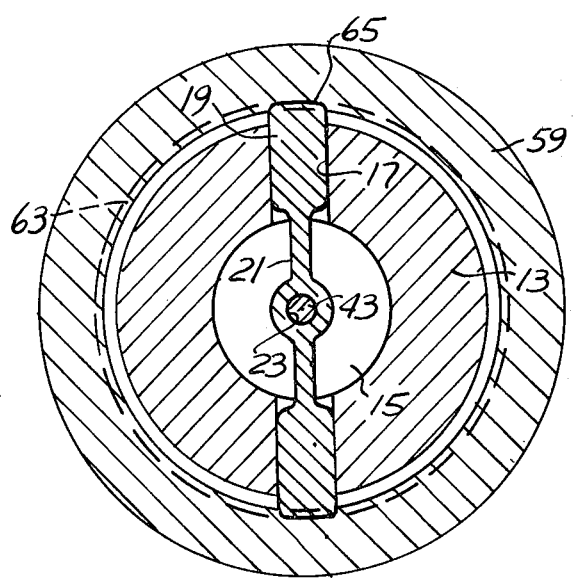

FLOW CONTROL VALVE

BACKGROUND OF THE INVENTION

Heretofore, in conventional type of ball check valves, there is normally free flow of fluid or liquid through the valve in one direction with the normal seating of the ball checking flow in the opposite direction.

BRIEF DESCRIPTION OF THE INVENTION

It is an object of the present invention to provide an improved flow control valve for a fluid power system which incorporates the principle of the ball check valve with free flow in one direction but provides a means for variably and adjustably unseating the ball of said valve to, thus, determine a variably controlled flow of fluid in the opposite direction depending upon the amount of said unseating.

It is another object to provide an improved flow control valve adapted to be interposed in a fluid power system which provides free flow of fluid in one direction and variably adjusted controlled flow of fluid in the opposite direction.

These and other objects will be seen from the following specification and claims in conjunction with the appended drawing.

THE DRAWING

FIG. 1 is a partially broken away longitudinal section of the present flow control valve.

FIG. 2 is a left end view thereof.

FIG. 3 is a section taken in the direction of arrows 3—3 of FIG. 1, on double scale.

FIG. 4 is an elevational view of the rod guide within the valve body.

It will be understood that the above drawing illustrates merely a preferred embodiment of the invention, and that other embodiments are contemplated within the scope of the claims hereafter set forth.

DETAILED DESCRIPTION OF THE INVENTION

Referring to the drawing, the present flow control valve is generally indicated at 11 and includes an elongated cylindrical body 13 having a bore 15. The bore at one end terminates in a transverse radial slot 17 which extends through the body as best shown in FIG. 3.

The rod stop guide 19 extends through the bore 15 at one end of the body and is slidably constrained within the radial body slot 17 for longitudinal movements relative to the body. The rod stop guide has a central web 21 which terminates in the axial bore 23.

Bore 15 within the body intermediate its ends terminates in a seat 25. Upon one side thereof there is a diverging annular bore 27 which terminates in the enlarged bore 29 and on the end thereof, counterbore 31 which supportably receives the rod guide 33 having a central bore 35, FIG. 4, to receive rod 39.

A control ball 37, which is generally hemispheric in shape, is adapted to seat as shown in FIG. 1 and is yieldably biased in such seating position by the coiled spring 47 which is interposed between said ball and the rod guide 33.

Rod 39 extends through the ball valve 37 and is secured thereto by pin 41, and terminates in a reduced portion 43 defining shoulder 45. The reduced portion of the rod slidably extends through rod stop guide 19 and in the position shown in FIG. 1, shoulder 45 is in registry with the longitudinally adjustable rod stop guide with the ball seated as shown.

Said body 13 has at one end the annular body end 49 of reduced diameter with an internal taper 51 at one end.

The corresponding end cap 53 has a tapered portion 54 adapted for cooperative registry with internal taper 51 and is internally threaded at 55 for threaded engagement over the body end 49 with suitable O ring seal 57 interposed between the end cap and adjusting sleeve 59.

Said adjusting sleeve is rotatively mounted upon the body and has a pair of annular knurled portions 61 to facilitate rotary adjustment thereof.

A portion of the bore of said adjusting sleeve is internally threaded at 63 and adapted for threaded registry with respect to the exterior thread 65 on the outer edges of the rod stop guide. By this construction, with the adjusting sleeve 59 restrained against endwise movement relative to the body by the end caps, FIG. 1, such rotary movement will effect longitudinal adjustment of the rod stop guide 19.

The opposite end of the body is internally threaded at 71 and is adapted to threadedly receive end cap 69 which projects into said body and retainingly engages rod guide 33.

A suitable O ring seal 73 is mounted upon the body, FIG. 1, and adapted for sealing registry with respect to the end cap 69. A corresponding O ring seal 57 is mounted upon the other end cap 53 for registry with the adjusting sleeve.

The respective apertured end caps 53 and 69 are internally threaded and are adapted to threadedly receive pipe segments 75 and 77 which form a part of a fluid power system.

Intermediate the ends of the body within as annular recess therein is provided an O ring seal 79 adapted for sealing registry with respect to the adjusting sleeve 59.

With the present flow control valve piped into a suitable fluid power system such as fragmentarily shown by the pipe ends 75 and 77, the flow of fluid in one direction would be a free flow as designated by the arrow in FIG. 1. The pressure of the fluid will move the slidably mounted ball 37 and rod 43 to its full travel compressing the spring 47 and stopping with a portion of the ball bearing upon the rod guide. Such fluid is then flowing full area of the pipe with no restriction.

Upon reversal of the fluid flow, the rod guide stop permits the control ball to seat as shown with flow in the other direction completely checked. This would correspond to the position of the adjusting sleeve 59 shown in FIG. 1. As said adjusting sleeve, constrained against endwise movement relative to the body is turned, it threadedly engages the rod stop guide 19 which is constrained against rotary movement by slot 17. Such rotary movement of the adjusting sleeve causes a longitudinal movement of the rod stop guide. Said guide acts against the shoulder 45 on rod 39 to progressively unseat the ball valve, moving it to a new location in the body. This controls, therefore, the amount of area present for the fluid to flow around the ball due to taper as the ball is held in this position by the spring on one side and by the rod stop guide upon the other side.

In the present illustrative embodiment, it will require 4 ½ revolutions of the adjusting sleeve 59 relative to the body to move the ball from the closed position shown in FIG. 1 to a full flowing position.

Set screw 67 extends through said sleeve and is adapted to retainingly engage body 13 for securing said sleeve in adjusted position.

Having described my invention, reference should now be had to the following claims.

1. A flow control valve comprising an elongated cylindrical body and having a longitudinal bore at one end, intermediate its ends terminating in a tapered seat and merging with an enlarged bore adjacent its other end;

said bore at said one end terminating in a radial slot through the body;

an externally threaded centrally apertured rod stop guide slidably mounted in said radial slot for longitudinal adjustments therein;

a centrally apertured rod guide nested in said body adjacent said enlarged bore;

a rod at one end slidably and axially mounted upon said rod guide having a reduced end portion slidably mounted upon and through said rod stop guide;

a ball valve mounted upon said rod yieldably biased into said seat;

an elongated cylindrical adjusting sleeve journalled and sealed upon said body and threadedly engaging said rod stop guide;

and apertured end caps threaded respectively into and over the ends of said body retaining said sleeve against relative endwise movement; said end caps adapted to threadedly receive a pair of pipe ends in a fluid line; whereby there is a normal free flow of fluid in one direction through said valve, with flow in the opposite direction checked from one extreme rotated position of said sleeve relative to said body.

2. In the flow control valve of claim 1, said adjusting sleeve adapted for variable manual rotation relative to said body for variably unseating said ball valve for opening flow through the valve in the opposite direction, in the range from closed to fully flowing position.

3. In the flow control valve of claim 1, the biasing of said ball valve including a coil spring interposed between said ball valve and said rod guide; one of said end caps retainingly engaging said rod guide.

4. In the flow control valve of claim 1, one end of the body having an annular reduced threaded end, one end cap being threaded over said reduced end and into one end of the adjacent sleeve and sealed with respect thereto; the other end of the body being internally threaded, the other end cap being threaded into said other end of said body and sealed with respect thereto.

5. In the flow control valve of claim 2, a radial set screw threaded into said adjusting sleeve adapted to frictionally engage said body for securing the sleeve into rotatably adjusted position.

6. In the flow control valve of claim 4, said reduced end of the body having an internal taper; and a corresponding tapered portion on said one end cap for centering and locating registry with respect to the body internal taper.

7. In a flow control ball check valve having an apertured body, a seat, a yieldable ball valve biased into said seat, and caps on the ends of the body;

a rod extending through the ball valve and adjacent its ends slidably mounted upon the body; said rod having a reduced portion defining a shoulder;

a rod stop guide slidably mounted in said body receiving the reduced portion of said rod and bearing against its shoulder, and an adjusting sleeve on said body interposed and retained between said end caps and threadedly engaging said rod stop guide, there being free flow of fluid through said body in one direction unseating and retracting said ball valve; flow in the opposite direction being checked; rotation of said sleeve relative to said body effecting longitudinal adjustments of said rod stop guide and rod for variably unseating said ball valve.

* * * * *